United States Patent
Mostajeran et al.

(10) Patent No.: US 11,507,092 B2
(45) Date of Patent: Nov. 22, 2022

(54) SEQUENTIAL CLUSTERING

(71) Applicant: Woven Planet North America, Inc., Los Altos, CA (US)

(72) Inventors: Ali Mostajeran, San Jose, CA (US); Mohammad Emadi, San Jose, CA (US); Jamaledin Izadian, San Jose, CA (US); Renyuan Zhang, Milpitas, CA (US)

(73) Assignee: Woven Planet North America, Inc., Los Altos, CA (US)

( * ) Notice: Subject to any disclaimer, the term of this patent is extended or adjusted under 35 U.S.C. 154(b) by 277 days.

(21) Appl. No.: 16/728,741

(22) Filed: Dec. 27, 2019

(65) Prior Publication Data

US 2021/0200209 A1    Jul. 1, 2021

(51) Int. Cl.
| | | |
|---|---|---|
| G05D 1/00 | (2006.01) | |
| G06F 16/28 | (2019.01) | |
| G01S 13/931 | (2020.01) | |
| G07C 5/08 | (2006.01) | |

(52) U.S. Cl.
CPC .......... *G05D 1/0088* (2013.01); *G01S 13/931* (2013.01); *G06F 16/285* (2019.01); *G07C 5/085* (2013.01); *G05D 2201/0213* (2013.01)

(58) Field of Classification Search
CPC .......... G05D 1/0088; G05D 2201/0213; G01S 13/931; G01S 7/411; G01S 7/415; G01S 7/417; G01S 13/44; G01S 13/582; G01S 2013/93271; G06F 16/285; G07C 5/085
USPC .................... 701/26, 514; 707/737; 704/245; 342/25 B, 159
See application file for complete search history.

(56) References Cited

U.S. PATENT DOCUMENTS

| | | | |
|---|---|---|---|
| 2007/0008210 A1* | 1/2007 | Kibayashi | G01S 13/726 |
| | | | 342/107 |
| 2016/0084944 A1 | 3/2016 | Bialer | |
| 2016/0252607 A1* | 9/2016 | Saboo | G06F 3/011 |
| | | | 342/107 |
| 2017/0134899 A1 | 5/2017 | Chan | |

(Continued)

FOREIGN PATENT DOCUMENTS

| | | |
|---|---|---|
| KR | 101349637 B1 | 1/2014 |
| KR | 20160069847 A | 6/2016 |

OTHER PUBLICATIONS

International Search Report and Written Opinion for International Application No. PCT/US2020/066690, dated Apr. 22, 2021.

*Primary Examiner* — Russell Frejd
*Assistant Examiner* — Ellis B. Ramirez
(74) *Attorney, Agent, or Firm* — Christopher G. Darrow; Darrow Mustafa PC

(57) ABSTRACT

In one embodiment, a method includes accessing a set of data points captured using a radar system of the vehicle. Each data point is associated with at least three measurements include a Doppler measurement, a range measurement, and an azimuth measurement in reference to the radar system. The method also includes clustering the set of data points into one or more first clusters based on a first pair of the three measurements associated with each of the data points; and clustering the set of data points into one or more second clusters based on a second pair of the three measurements associated with each of the data points. The second pair being different from the first pair of the three measurements.

18 Claims, 10 Drawing Sheets

(56) References Cited

U.S. PATENT DOCUMENTS

| | | | |
|---|---|---|---|
| 2017/0254895 A1* | 9/2017 | Tong | G01S 13/931 |
| 2018/0183650 A1* | 6/2018 | Zhang | H04B 1/38 |
| 2019/0101634 A1* | 4/2019 | Baheti | G01S 7/415 |
| 2019/0187250 A1* | 6/2019 | Ru | G01S 7/4021 |
| 2019/0310360 A1* | 10/2019 | Hershkowitz | G01S 13/505 |
| 2019/0391250 A1* | 12/2019 | Cohen | G01S 13/58 |
| 2020/0371228 A1* | 11/2020 | Wang | G06K 9/00791 |

* cited by examiner

SEQUENTIAL CLUSTERING

BACKGROUND

A vehicle with a driving-control system may be a vehicle that is capable of sensing its environment and navigating with reduced to no human input. The vehicle may be equipped with a variety of systems or modules for enabling it to determine its surroundings and safely navigate to target destinations. For example, the driving-control system may be an integrated computing system (e.g., one or more central processing units, graphical processing units, memory, and storage) for controlling various operations of the vehicle, such as driving and navigating. To that end, the driving-control system may process data from one or more sensor arrays. For example, an autonomous vehicle may have optical cameras for, e.g., recognizing roads and lane markings; infrared cameras for, e.g., night vision; LiDARs for, e.g., detecting 360° surroundings; radar for, e.g., detecting distant hazards; stereo vision for, e.g., spotting hazards such as pedestrians or tree branches; wheel sensors for, e.g., measuring velocity; ultrasound for, e.g., parking and obstacle detection; global positioning system (GPS) for, e.g., determining the vehicle's current geolocation; and/or inertial measurement units, accelerometers, gyroscopes, and/or odometer systems for movement or motion detection. Data from these systems and modules may be used by the driving-control system to safely guide or assist the navigation of the vehicle.

Driving-control systems have a limited computational budget (e.g in terms of time and power) for performing critical navigation functions, such as, for example, perception of agents in the surrounding environment or prediction of the future locations of these agents. A perception module of the driving-control system processes the data from the sensors of the vehicle and generates a representation of the current state of the vehicle's environment, including agents that may be hazards to the vehicle. Roads are a dynamic, chaotic, and interference-laden environment that is particularly challenging for driving-control systems to identify different objects. Depending on the number and type of sensors, the amount of sensor data that needs to be processed to generate the representation of the environment and identify agents may be immense, which may tax the limited computational budget of the driving-control system.

DESCRIPTION OF EXAMPLE EMBODIMENTS

Figure 1:
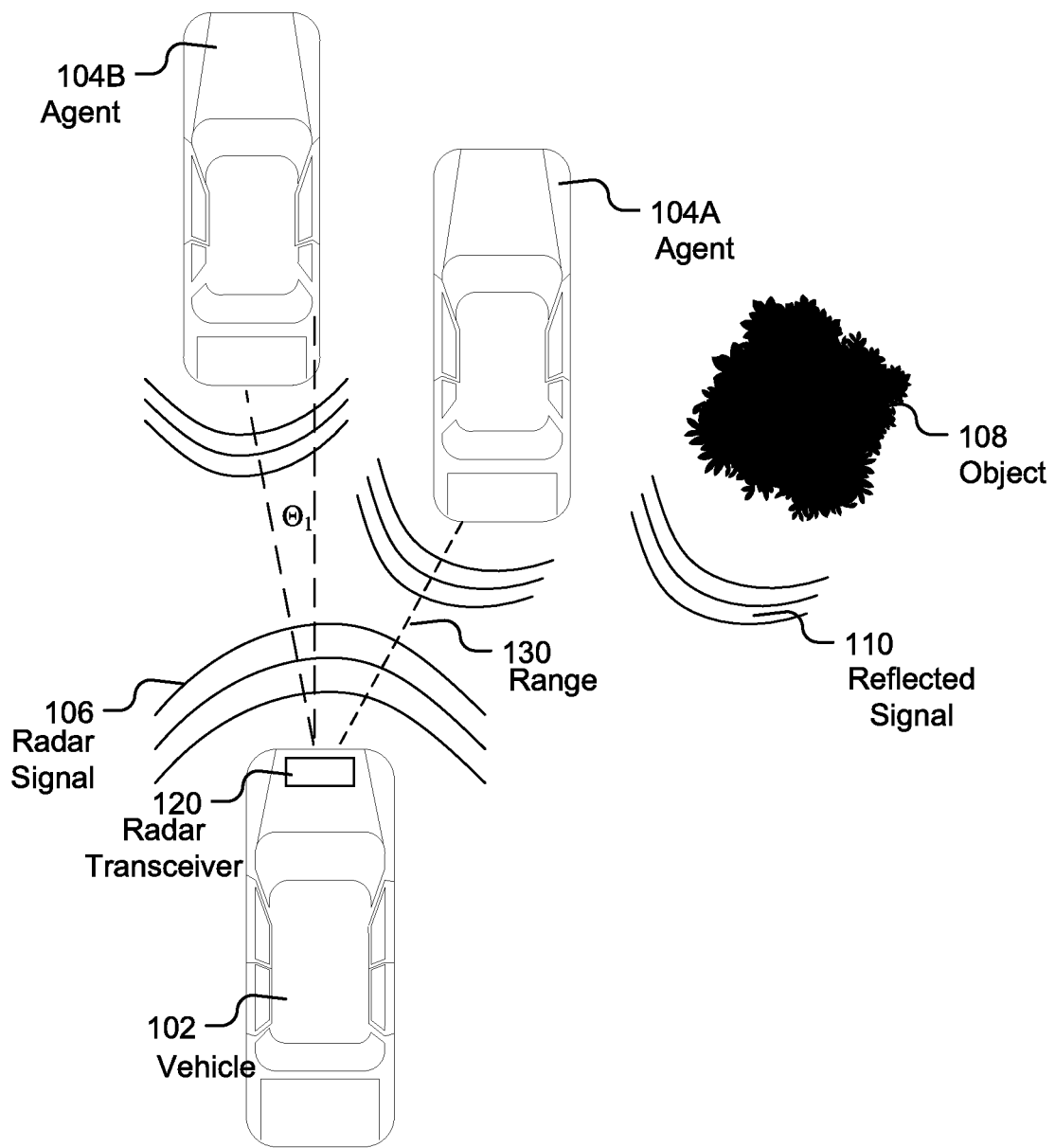
FIG. 1 illustrates an example radar detection of objects.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Subject matter described herein is generally directed to reducing the computational burden associated with object tracking using radar systems. A vehicle with a driving-control system may be a vehicle that is capable of sensing its environment and navigating with reduced to no human input. The vehicle may be equipped with a variety of systems or modules for enabling it to determine its surroundings and safely navigate to target destinations. For example, the driving-control system may be an integrated computing system (e.g., one or more central processing units, graphical processing units, memory, and storage) for controlling various operations of the vehicle, such as driving and navigating. To that end, the driving-control system may process data from one or more sensor arrays. For example, an autonomous vehicle may have optical cameras for, e.g., recognizing roads and lane markings; infrared cameras for, e.g., night vision; LiDARs for, e.g., detecting 360° surroundings; radar for, e.g., detecting distant hazards; stereo vision for, e.g., spotting hazards such as pedestrians or tree branches; wheel sensors for, e.g., measuring velocity; ultrasound for, e.g., parking and obstacle detection; global positioning system (GPS) for, e.g., determining the vehicle's current geolocation; and/or inertial measurement units, accelerometers, gyroscopes, and/or odometer systems for movement or motion detection. Data from these systems and modules may be used by the driving-control system to safely guide or assist the navigation of the vehicle.

Driving-control systems have a limited computational budget s of time and power) for performing critical navigation functions, such as, for example, perception of agents in the surrounding environment or prediction of the future locations of these agents. A perception module of the driving-control system processes the data from the sensors of the vehicle and generates a representation of the current state of the vehicle's environment, including agents that may be hazards to the vehicle. Depending on the number and type of sensors, the amount of sensor data that needs to be processed to generate the representation of the environment and identify agents may be immense, which may tax the limited computational budget of the driving-control system. It is useful for the driving-control system to reduce the number of points to be analyzed. In particular embodiments, the computational burden to the driving-control system may be reduced by grouping the data points into clusters, where a single cluster may represent a number of data points. As described below in more detail, a particular agent in the environment may be assigned to one of the clusters for subsequent tracking and trajectory prediction. Successful road navigation requires maximum performance that may be achieved by simplifying the complex information in three dimensions extracted from the sensor data into independent clustering in two dimensions.

FIG. 1 illustrates an example radar detection of objects. A vehicle 102 may include a sensor array that includes a radar transceiver. As described in more detail below, a driving-control system of vehicle 102 may receive data from the radio detection and ranging (radar) transceiver 120, as well as, data from other sensors of the sensor array to determine the environment, including agents 104A-104B and objects 108, surrounding vehicle 102. As described in more detail below, the radar transceiver is configured to transmit radio-frequency (RF) pulses 106 and receive a reflected signal 110 from agents 104A-104B and objects 108. Reflected radar signals 110 may be processed to extract data corresponding to a velocity (Doppler) measurement, distance (range) measurement, and azimuth (lateral) angle measurement of agents 104A-104B and objects 108. A range 130 of an object (e.g., agent 104A) from vehicle 102 may be determined based on the time of flight of radar signals 106 being transmitted and the reflected signal 110 received by the radar system. The Doppler of an object may be determined based on the frequency shift of radar signals 106 being transmitted and the reflected signal 110 received by the radar system. By scanning radar signals 106 in the horizontal plane, the radar system is able to determine the azimuth angle $\Theta_1$ of an object (e.g., agent 104B) relative to vehicle 102. For a given object (agents 104A-104B or object 108), depending on the surface contour, composition, or size of the object, each object in the field of view (FOV) of the radar transceiver may generate dozens or hundreds of data points, each of which has its range 130, Doppler, and azimuth angle $\Theta_1$.

Figure 2:
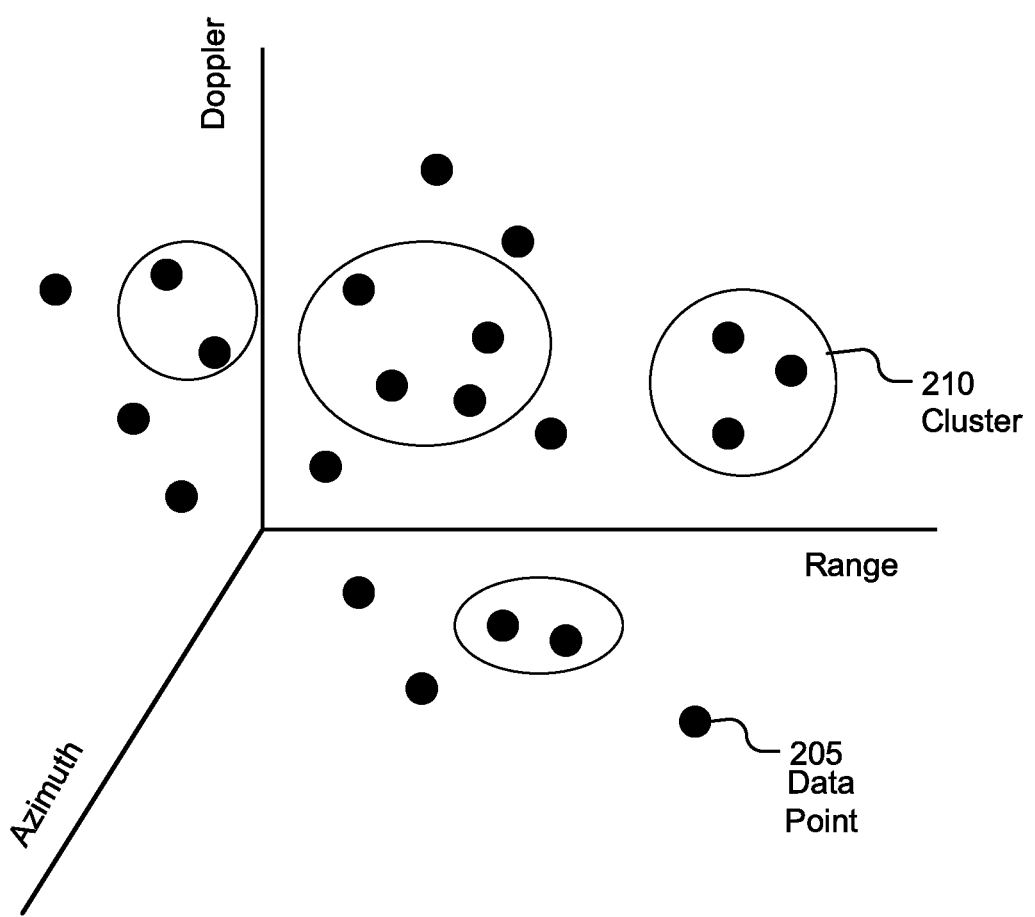
FIG. 2 illustrates example radar data points in a multi-dimensional 3D space.

FIG. 2 illustrates example radar data points in a multi-dimensional space. Radar signals may be processed to provide data in a three-dimensional (3D) space corresponding to the dimensions of range (distance), Doppler (velocity), and azimuth (lateral) angle. The reflected radar signals from each object within the field of view (FOV) of the radar transceiver may produce multiple data points 205 that each have an associated range, velocity, and elevation. As illustrated in the example of FIG. 2, a radar reading may typically provide a large number of data points with a distribution in the 3D space formed by these dimensions (Doppler, range, azimuth). The driving-control system has a limited computational budget to process the sensor data to determine which data points belong to a particular object and track the objects surrounding the vehicle.

The computation burden of tracking multiple data points 205 may be reduced by representing multiple data points as one or more clusters 210. These clusters may be a single data point that represents multiple data points generated by an object, which reduces the computation burden of tracking the object and predicting its trajectory. Clustering data points 205 in the 3D space is computationally expensive and may lead to erroneous clustering of data points due to high variation and inaccuracy of the azimuth angle determination from interference and relatively low power of the reflected signals. For example, data points from separate agents having a similar speed, but different ranges from the vehicle may be erroneously combined into the same cluster. Similarly, a stationary object and an agent at the same range from the vehicle may be erroneously clustered together.

Figure 3:
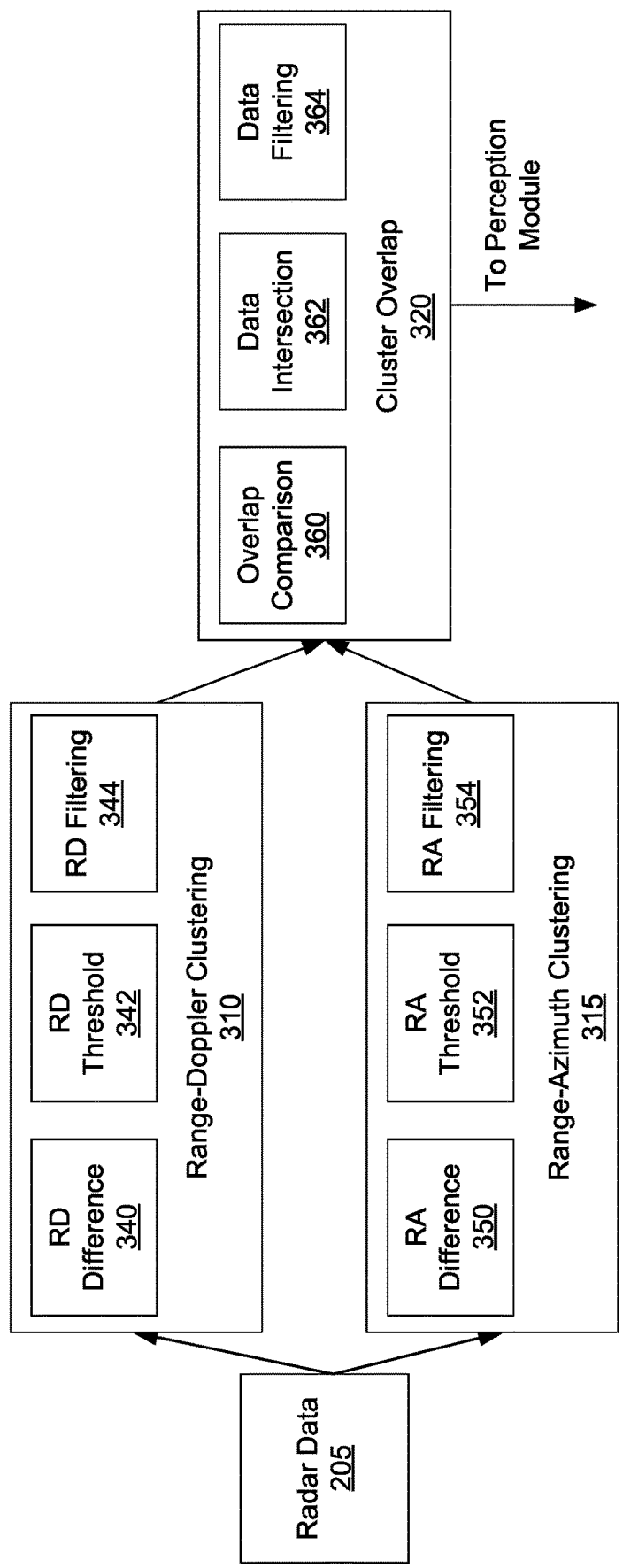
FIG. 3 illustrates an example computing architecture for the sequential clustering of radar data.

FIG. 3 illustrates an example computing architecture for the sequential clustering of radar data. As described in more detail above, radar data 205 may be data captured by a radar transceiver of a vehicle. Clusters that accurately represent objects for subsequent tracking and prediction may be determined by sequentially clustering radar data 205 in two of the measurements based on radar data 205. As illustrated in the example of FIGS. 4-7 below, the sequential clustering of radar data 205 may be performed in the range-Doppler (RD) space and the range-azimuth (RA) space. As illustrated in the example of FIG. 3, a computing architecture 300 for sequentially clustering radar data 305 may include a range/Doppler clustering module 310, range/azimuth clustering module 315, and cluster overlap module 320.

In particular embodiments, range-Doppler clustering module 310 and range-azimuth clustering module 315 may cluster radar data 205 into clusters using a suitable clustering algorithm. As illustrated in the example of FIG. 3, range-Doppler clustering module 310 may include a range-Doppler (RD) difference module 340, RD threshold module 342, and RD filtering module 344. Range-azimuth clustering module 315 may include a range-azimuth (RA) difference module 350, RA threshold module 352, and RA filtering module 354. Range-Doppler clustering module 310 and range-azimuth clustering module 315 may cluster radar data 205 using density-based spatial clustering of applications with noise (DBSCAN) algorithm. The DBSCAN algorithm clusters data points based on a difference measurement in the 2D space (e.g., range-Doppler space) between data points and a minimum number of points. As an example and not by way of limitation, if the difference between two data points is lower or equal to a threshold value of the difference, these data points are considered neighbors. In addition, the DBSCAN algorithm forms clusters that have a threshold minimum number of data points that meet the difference requirement. As an example and not by way of limitation, the threshold minimum number of data points for a cluster can be based on a number of dimensions in the data set. Although this disclosure describes and illustrates a particular algorithm for clustering data points, this disclosure contemplates any suitable algorithm for clustering data points, such as, for example, K-means or hierarchical clustering.

Range-Doppler clustering module 310 may group radar data 205 in a range-Doppler (RD) space into one or more RD clusters. As an example and not by way of limitation. RD difference module 340 may determine the difference in the RD space between each data point and adjacent data points. In particular embodiments, RD threshold module 342 may determine which data points are within a threshold difference in range and Doppler from its neighboring data points based on the output of RD difference module 340. For example, range-Doppler clustering module 310 may determine the difference in range and Doppler based on the distance in the RD space between the data points. RD filtering module 344 may determine RD clusters based on a number of data points that form each cluster. In particular embodiments, range-Doppler clustering module 310 may remove data points from an RD cluster that has a range difference between any two data points of a cluster with a range difference above a threshold maximum range threshold. In other words, two data points with relatively close Doppler (velocity) but that are a large distance apart from each other should be considered data points originating from separate objects or agents.

Figure 5:
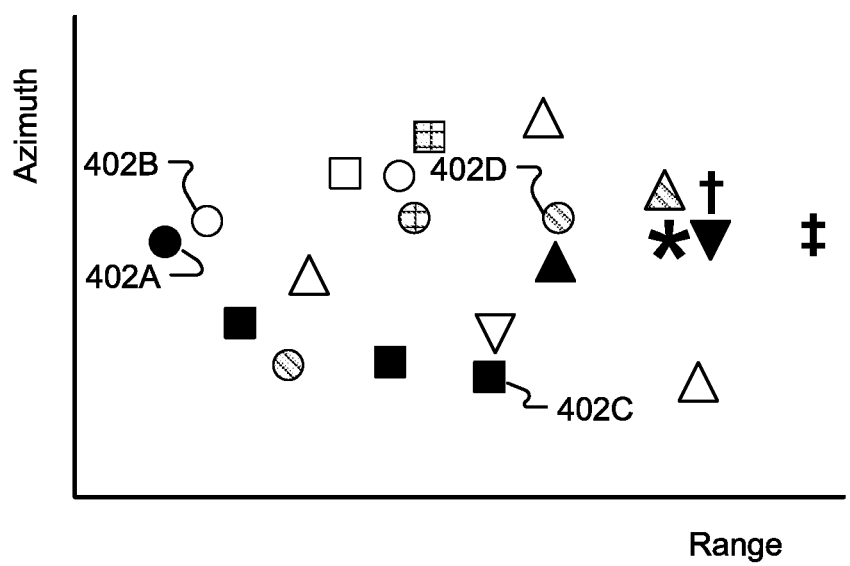
FIG. 5 illustrates an example range-azimuth distribution of radar data.

As illustrated in the example of FIG. 5, range-azimuth clustering module 315 may separately cluster data points in a range-azimuth (RA) space into one or more RA clusters. As an example and not by way of limitation. RA difference module 350 may determine the difference in the RA space between each data point and adjacent data points. In particular embodiments, RA threshold module 352 may determine which data points are within a threshold difference in range and azimuth angle from its neighboring data points based on the output of RA difference module 350. For example, range-azimuth clustering module 315 may determine the difference in range and azimuth angle based on the distance in the RD space between the data points. RA filtering module 354 may determine RA clusters based on a number of data points that form each cluster.

Cluster overlap module 320 may receive information identifying RD clusters and their data points from range-Doppler clustering module 310 and information identifying RA clusters and their data points from range-azimuth clustering module 315. As illustrated in the example of FIG. 3, cluster overlap module 320 may include overlap comparison module 360, data intersection module 362, and data filtering module 364. In particular embodiments, overlap comparison module 360 compares the clusters in the RD space and the clusters in the RA space. In particular embodiments, data intersection module 320 may determine one or more overlap clusters in the RA space based on an intersection of data points of the RD clusters and data points of the RA clusters. In other words, data intersection module 362 may identify overlap clusters based on identifying data points common to both the RD and RA clusters. As an example and not by way of limitation, data intersection module 362 may identify a particular RA cluster corresponding to a particular RD cluster based on a range associated with the data points of the particular RD cluster and the data points of the particular RA cluster. In other words, cluster overlap module 362 may compare RD clusters with data points that have the same range value as the data points of the RA clusters. In particular embodiments, cluster overlap module 362 may identify overlap clusters or the data points associated with the overlap clusters based on additional criteria. As an example and not by way of limitation, data intersection module 362 may identify an overlap cluster based on data points of RD clusters that have similar Doppler and range, but different azimuth within a threshold azimuth difference. In particular embodiments, data intersection module 362 may assign data points to a particular overlap cluster if the data points are within a threshold difference (e.g., range or azimuth) to the particular overlap cluster and the received signal strength indicator (RSSI) of the data point is higher than a RSSI threshold value.

In particular embodiments, data filtering module 364 may remove overlap clusters or the data points associated with the overlap clusters based on additional criteria. As an example and not by way of limitation, if the number of data points that are common between corresponding RA and RD clusters is below a threshold number of data points, data filtering module 364 may disregard or remove these overlap clusters. As another example, data filtering module 364 may remove one or more data points from the overlap clusters based on a Doppler variation of the one or more data points being greater than a threshold amount of Doppler variation. In other words, data filtering module 364 may remove a data point from an overlap cluster if the Doppler variation between the data points is above a threshold difference indicating these data points correspond to separate objects or agents. As another example, data filtering module 364 may remove one or more data points from the overlap clusters based on a range variation between the data points being higher than a threshold amount of range variation, which may indicate these data points correspond to separate objects or agents. As another example, data filtering module 364 may ignore or remove one or more data points based on the RSSI of the data point is less than a threshold value. In other words, a data point having an RSSI value less than a threshold RSSI value may be ignored or filtered since the low RSSI value may indicate an erroneous data point generated by noise. As another example, data filtering module 364 may ignore or filter data points that are not associated with an overlap cluster.

In particular embodiments, cluster overlap module 320 may calculate the range and Doppler of the overlap clusters based on an RSSI weighting of a summation of either the range or the Doppler of each data point of the cluster and averaging the sum over the total RSSI of the data points of the cluster. Similarly, cluster overlap module 320 may calculate a center location of the overlap cluster based on an average of the location of the data points of the overlap cluster weighted by an RSSI value of each data point of the overlap cluster. In particular embodiments, cluster overlap module 320 may associate the overlap clusters with an object in the environment and provide the overlap clusters to a prediction module of a driving-system navigation pipeline. In particular embodiments, cluster overlap module 320 may provide information on the range, Doppler, azimuth, and center of each overlap cluster. In particular embodiments, the output of cluster overlap module 320 may be provided to a perception module, described in more detail below, of a driving-control navigation pipeline. As an example and not by way of limitation, the overlap clusters or associated information (e.g., location or velocity) may be transmitted to a perception module for neural fusion with data from other types of sensors or for prediction/object detection based on the sequential clustering.

Figure 4:
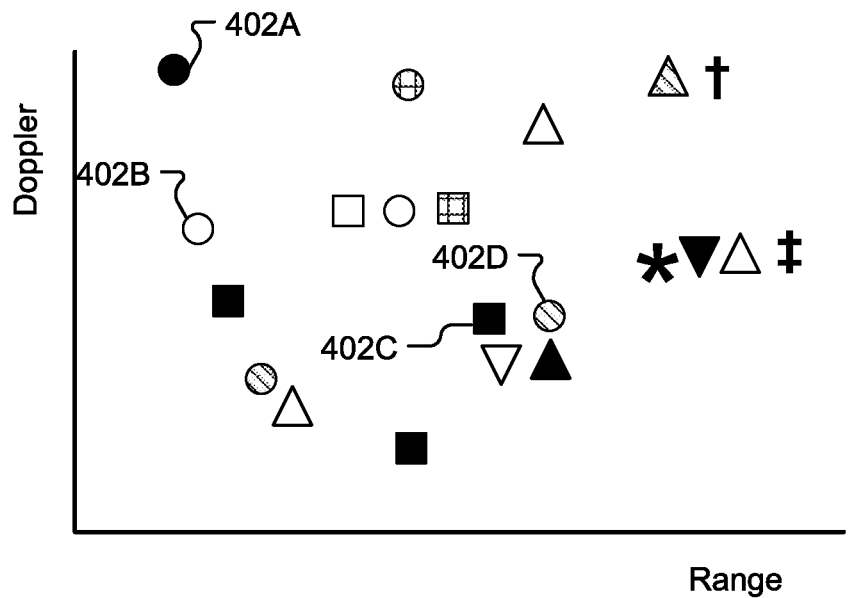
FIG. 4 illustrates an example range-Doppler distribution of radar data.

FIG. 4 illustrates an example range-Doppler distribution of radar data. As described above in more detail, each data point (e.g., 402A-402D) has a range, Doppler, and azimuth angle. Each data point (e.g., 402A-402D) may correspond to a reflected signal from an object (e.g., an agent) or may be a result of interference or noise. FIG. 4 illustrates an example range-Doppler distribution of radar data extracted from the received radar signals are distributed in a range-Doppler (RD) space. Similarly, FIG. 5 illustrates an example range-azimuth distribution of radar data in a range-azimuth (RA) space. As described in more detail above, post-processing of the entirety of data points (e.g., 402A-402D) may be a significant drain on the computing and vehicle power resources of the vehicle. This burden may be significantly reduced through the use of clustering and filtering.

As illustrated in the example of FIG. 2, plotting the data points in 3D space (range, Doppler, and azimuth angle) may result in unreliable object determination. Furthermore, as illustrated in the example of FIGS. 4-5, plotting data points (e.g., 402A-402D) in RA space and RD space may lead to inconsistent results. As an example and not by way of limitation, when plotted in RA space, data point 402A and data point 402B may appear to correspond to a single object. When plotted in RD space, data point 402A and data point 402B may appear to correspond to different objects. As another example, when plotted in RA space, data point 402C and data point 402D may appear to correspond to a single object. When plotted in RD space, data point 402C and data point 402D may appear to correspond to different objects. These inconsistencies may be resolved through the application of overlap clustering, described below in more detail.

Figure 6:
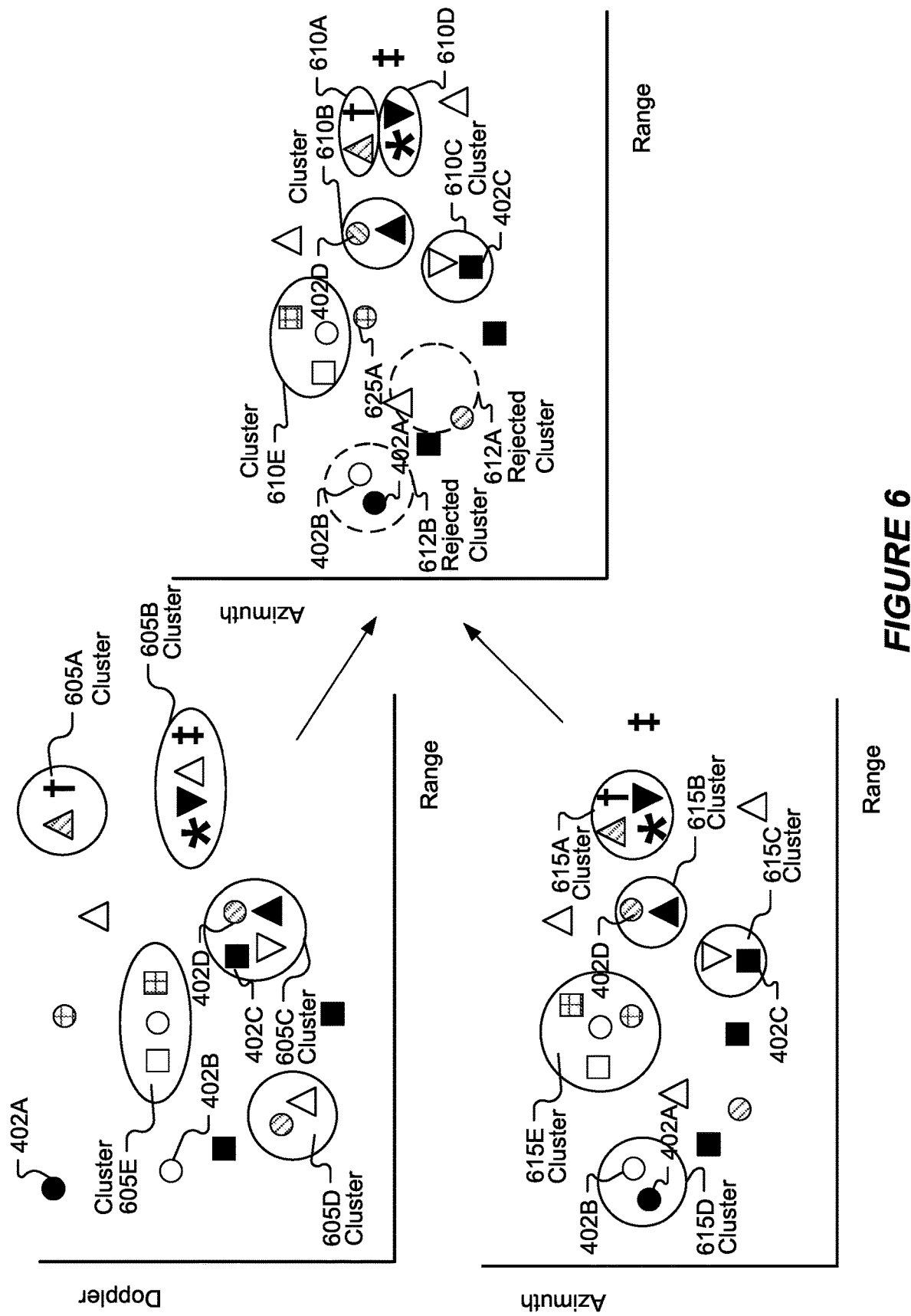
FIG. 6 illustrates an example overlap clustering from range-Doppler clusters and range-azimuth clusters.

FIG. 6 illustrates an example overlap clustering from range-Doppler clusters and range-azimuth clusters. As described in more detail above, a range-Doppler clustering module may cluster data points distributed in a range-Doppler (RD) space into one or more RD clusters 605A-605E. In particular embodiments, data points in the RD space may be clustered in the RD space based on determining which data points are within a threshold difference in range and Doppler from its neighboring data points, as well as the number of data points that form each RD cluster 605A-605E. As illustrated in the example of FIG. 6, data point 402A and data point 402B are not part of any RD clusters 605A-605E, while data point 402C and data point 402D are part of RD cluster 605C. The data points in the RA space may be clustered in the RA space based on determining which data points are within a threshold difference in range and azimuth from its neighboring data points, as well as the number of data points that form each RA cluster 615A-615E. As illustrated in the example of FIG. 6, data point 402A and data point 402B are part of any RD cluster 615D, while data point 402C is part of RA cluster 615C and data point 402D is part of RD cluster 615C.

As illustrated in the example of FIG. 6, RD clusters 605A-6 and RA clusters 615A-615E may be analyzed to identify overlap clusters (e.g., 610A-610E) that have co mon data points. As an example and not by way of limitation, RD cluster 605E and RA cluster 615E may be determined to correspond to each other and have an intersection of 3 common data points. As an example and not by way of limitation, this overlap cluster 610E may be determined from RD cluster 605E and RA cluster 615E based on the 3 common data points of these clusters (RD cluster 605E and RA cluster 615E) having a similar range value. Overlap cluster 610E may be formed to include these 3 common data points.

In particular embodiments, data point 625A from RA cluster 615E may not be included in overlap cluster 610E because of a significant difference in Doppler (but below the threshold Doppler difference) from the data points of RD cluster 410E. Since the difference in Doppler is below the threshold value, data point 625A may be included in overlap cluster 610E based on the RSSI value of data point 625A being higher than a threshold RSSI value. As another example, RD cluster 605C and RA cluster 615C may be determined to have an intersection of 2 common data points. Overlap cluster 610C may be formed to include the 2 common data points from RD cluster 605C and RA cluster 615C. Similarly, RD cluster 605C and RA cluster 615B may be determined to have an intersection of 2 common data points. Overlap cluster 610B may be formed to include the 2 common data points from RD cluster 605C and RA cluster 615B. In particular embodiments, overlap cluster 610B, including data point 402D, and overlap cluster 610C, including data point 402C, may not be combined since the azimuth difference between the data points of RA cluster 615B and RA cluster 615C is larger than the threshold azimuth difference.

As another example, RD cluster 605A and RA cluster 615A may be determined to have an intersection of 2 common data points. Overlap cluster 610A may be formed to include the 2 common data points from RD cluster 605A and RA cluster 615A. RD cluster 605B and RA cluster 615A may be determined to have an intersection of 2 common data points. Overlap cluster 610D may be formed to include the 2 common data points from RD cluster 605B and RA cluster 615A. In particular embodiments, though overlap cluster 610A and overlap cluster 610D may be close in the RA space, as illustrated in the example of FIG. 5, the overlap cluster module may not combine these overlap clusters 610A and 610D because these overlap clusters 610A and 610D have different Doppler values (above the Doppler threshold value), as illustrated in the example of FIG. 6 (RA cluster 605A and RA cluster 605B). In particular embodiments, the cluster overlap module may reject one or more clusters based on one or more criteria. As an example of FIG. 6, the overlap cluster module may identify rejected cluster 612B that includes data point 402A and data point 402B. While data point 402A and data point 402B may have a similar range and azimuth values, the Doppler variation between these data points is larger than the threshold Doppler value. In particular embodiments, the overlap cluster module identifies a rejected cluster 612A that includes the data points of RD cluster 615D. While the data points of RD cluster 615D may have a similar range and Doppler values, as seen in the RD space distribution, the azimuth variation between these data points is larger than the threshold azimuth value, as seen in the RA space distribution. In particular embodiments, data points that are not associated with any of the overlap clusters 610A-610E may be filtered and not used in downstream post-processing.

Figure 7:
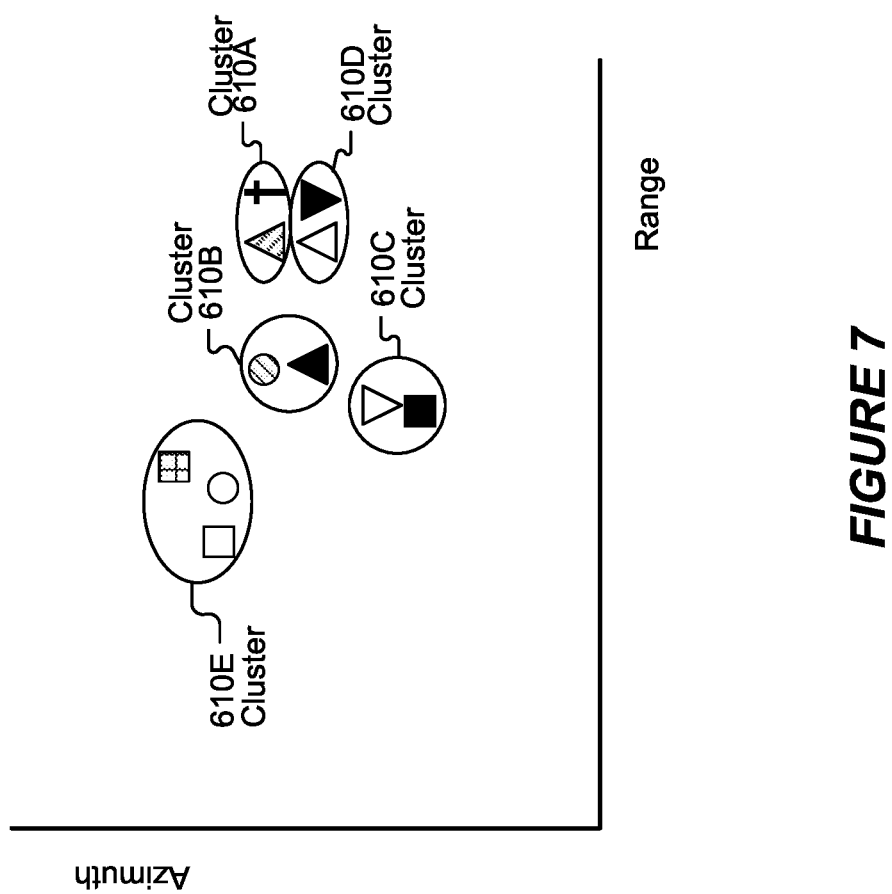
FIG. 7 illustrates an example overlap clusters.

FIG. 7 illustrates an example overlap clusters. Overlap clusters 610A-610E, as illustrated in the example of FIG. 7, may be provided to downstream modules of the driving-system navigation pipeline for additional object processing and trajectory prediction. In particular embodiments, the location and speed associated with each overlap cluster 610A-610E may be calculated as described in more detail above. The location and speed of overlap clusters 610A-610E may also be provided to the driving-system navigation pipeline.

Figure 8:
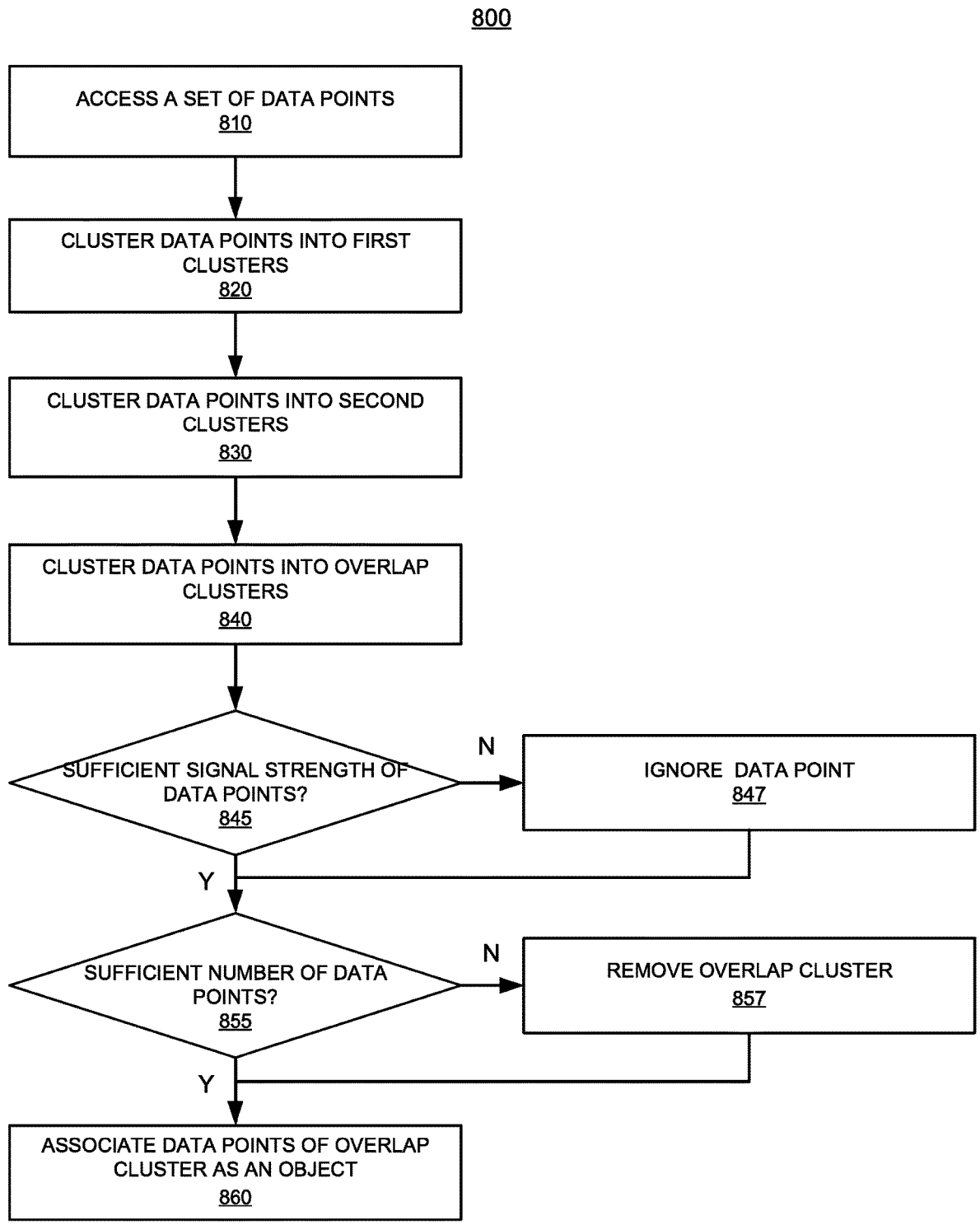
FIG. 8 illustrates an example method for the sequential clustering of radar data.

FIG. 8 illustrates a method for the sequential clustering of radar data. The method 800 may begin at step 810, where a computing system may access a set of data points captured using a radar system. In particular embodiments, each data point is associated with at least three measurements that include a Doppler measurement, a range measurement, and an azimuth measurement. As an example and not by way of limitation, some of the data points may be reflected radar signals from agents in the environment and may provide the distance and velocity of the agents relative to a vehicle. At step 820, the computing system may cluster the set of data points into one or more first clusters based on a first pair of the three measurements associated with each of the data points. As an example and not by way of limitation, the data points may be clustered based on the range and Doppler values associated with the data points. At step 830, the computing system may cluster the set of data points into one or more second clusters based on a second pair of the three measurements associated with each of the data points. In particular embodiments, the second pair of measurements is different from the first pair of the three measurements. As an example and not by way of limitation, the data points may be clustered based on the range and azimuth values associated with the data points.

At step 840, the computing system may determine one or more overlap clusters of the data points based on comparisons between the one or more first clusters and the one or more second clusters. As an example and not by way of limitation, the computing system may identify a particular second cluster corresponding to a particular first cluster based on a range associated with the data points of the particular first cluster and the data points of the particular second cluster. As an example and not by way of limitation, the intersection may be determined using dimensions corresponding to the second pair of the three measurements (e.g., range and azimuth angle). In particular embodiments, the computing system may determine overlap clusters based on determining an intersection of data points of the particular second cluster with the data points of the corresponding particular first cluster. In particular embodiments, at step 845, the computing system may determine whether the RSSI of one or more data points of the first clusters or second clusters outside of the intersection is higher than a threshold RSSI value. In particular embodiments, at step 847, the computing system may filter the one or more data points of the overlap clusters with an RSSI lower than a threshold RSSI value.

In particular embodiments, at step 855, the computing system may determine whether the overlap clusters have more than a threshold number of data points. In particular embodiments, at step 857, the computing system may remove the overlap cluster if it has fewer than the threshold number of data points. At step 860, the computing system may associate the data points of each of the overlap clusters as an object in an environment of the vehicle. As an example and not by way of limitation, the computing system may represent the data points by the location and speed of the overlap clusters.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for sequential clustering of radar data including the particular steps of the method of FIG. 8, this disclosure contemplates any suitable method for sequential clustering of radar data including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9:
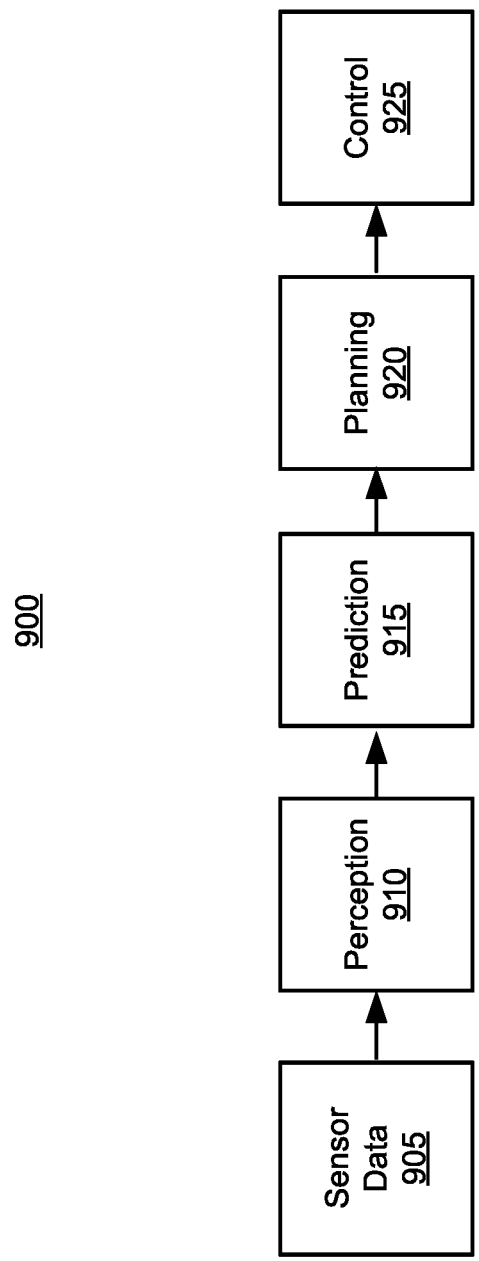
FIG. 9 illustrates an example block diagram of an example driving-control navigation pipeline.

FIG. 9 illustrates an example block diagram of a driving-control navigation pipeline. In particular embodiments, a driving-control navigation pipeline 900 may include a number of computing modules, such as a sensor data module 905, perception module 910, prediction module 915, planning module 920, and control module 925. Sensor data module 905 may obtain and preprocess sensor/telemetry data that is provided to perception module 910. Such data may be captured by any suitable sensors of a vehicle. As an example and not by way of limitation, the vehicle may have a Light Detection and Ranging (LiDAR) sensor that is configured to transmit pulsed laser beams in multiple directions and measure the reflected signal from objects surrounding the vehicle. The time of flight of the light signals may be used to measure the distance or depth of the objects from the LiDAR. As another example, the vehicle may have optical cameras pointing in different directions to capture images of the vehicle's surroundings. Radar may also be used by the vehicle for detecting other vehicles and/or hazards at a distance. As further examples, the vehicle may be equipped with ultrasound for close-range object detection, e.g., parking and obstacle detection or infrared cameras for object detection in low-light situations or darkness. In particular embodiments, sensor data module 905 may suppress noise in the sensor data or normalize the sensor data.

Perception module 910 is responsible for correlating and fusing the data from the different types of sensors of the sensor module 905 to model the contextual environment of the vehicle. Perception module 910 may use information extracted by multiple independent sensors to provide information that would not be available from any single type of sensors. Combining data from multiple sensor types allows the perception module 910 to leverage the strengths of different sensors and more accurately and precisely perceive the environment. As an example and not by way of limitation, image-based object recognition may not work well in low-light conditions. This may be compensated by sensor data from LiDAR or radar, which are effective sensors for measuring distances to targets in low-light conditions. As another example, image-based object recognition may mistakenly determine that an object depicted in a poster is an actual three-dimensional object in the environment. However, if depth information from a LiDAR is also available, the perception module 910 could use that additional information to determine that the object in the poster is not, in fact, a three-dimensional object.

Perception module 910 may process the available data (e.g., sensor data, data from a high-definition map, etc.) to derive information about the contextual environment. For example, perception module 910 may include one or more agent modelers (e.g., object detectors, object classifiers, or machine-learning models trained to derive information from the sensor data) to detect and/or classify agents present in the environment of the vehicle (e.g., other vehicles, pedestrians, moving objects). Perception module 910 may also determine the various characteristics of the agents. For example, perception module 910 may track the velocities, moving directions, accelerations, trajectories, relative distances, or relative positions of these agents. In particular embodiments, perception module 910 may also leverage information from a high-definition map. The high-definition map may include a precise three-dimensional model of the environment, including buildings, curbs, street signs, traffic lights, and any stationary fixtures in the environment. Using the vehicle's GPS data and/or image-based localization techniques (e.g., simultaneous localization and mapping, or SLAM), the perception module 910 could determine the pose (e.g., position and orientation) of the vehicle or the poses of the vehicle's sensors within the high-definition map. The pose information, in turn, may be used by the perception module 910 to query the high-definition map and determine what objects are expected to be in the environment.

Perception module 910 may use the sensor data from one or more types of sensors and/or information derived therefrom to generate a representation of the contextual environment of the vehicle. As an example and not by way of limitation, the representation of the contextual environment may include objects such as other vehicles, curbs, debris, objects, and pedestrians. The contextual representation may be limited to a maximum range of the sensor array (e.g., 50, 100, or 200 meters). The representation of the contextual environment may include information about the agents and objects surrounding the vehicle, as well as semantic information about the traffic lanes, traffic rules, traffic signs, time of day, weather, and/or any other suitable information. The contextual environment may be represented in any suitable manner. As an example and not by way of limitation, the contextual representation may be encoded as a vector or matrix of numerical values, with each value in the vector/matrix corresponding to a threshold category of information. For example, each agent in the environment may be represented by a sequence of values, starting with the agent's coordinate, classification (e.g., vehicle, pedestrian, etc.), orientation, velocity, trajectory, and so on. Alternatively, information about the contextual environment may be represented by a raster image that visually depicts the agent, semantic information, etc. For example, the raster image may be a birds-eye view of the vehicle and its surroundings, up to a threshold distance. The raster image may include visual information (e.g., bounding boxes, color-coded shapes, etc.) that represent various data of interest (e.g., vehicles, pedestrians, lanes, buildings, etc.).

The representation of the present contextual environment from the perception module 910 may be consumed by a prediction module 915 to generate one or more predictions of the future environment. For example, given a representation of the contextual environment at time t, prediction module 915 may output another contextual representation for time $t_1$. For instance, if the t contextual environment is represented by a raster image, the output of the prediction module 915 may be another raster image (e.g., a snapshot of the current environment) that depicts where the agents would be at time $t_1$ (e.g., a snapshot of the future). In particular embodiments, prediction module 915 may include a machine-learning model (e.g., a convolutional neural network, a neural network, a decision tree, support vector machines, etc.) that may be trained based on previously recorded contextual and sensor data. For example, one training sample may be generated based on a sequence of actual sensor data captured by a vehicle at times t and $t_1$. The captured data at times t and $t_1$ may be used to generate, respectively, a first contextual representation (the training data) and a second contextual representation (the associated ground-truth used for training). During training, the machine-learning model may process the first contextual representation using the model's current configuration parameters and output a predicted contextual representation. The predicted contextual representation may then be compared to the known second contextual representation (i.e., the ground-truth at time $t_1$). The comparison may be quantified by a loss value, computed using a loss function. The loss value may be used (e.g., via back-propagation techniques) to update the configuration parameters of the machine-learning model so that the loss would be less if the prediction were to be made again. The machine-learning model may be trained iteratively using a large set of training samples until a convergence or termination condition is met. For example, training may terminate when the loss value is below a threshold. Once trained, the machine-learning model may be used to generate predictions of future contextual representations based on current contextual representations.

Planning module 920 may determine the navigation routes and particular driving operations (e.g., slowing down, speeding up, stopping, swerving, etc.) of the vehicle based on the predicted contextual representation generated by the prediction module 915. In particular embodiments, planning module 920 may utilize the predicted information encoded within the predicted contextual representation (e.g., predicted location or trajectory of agents, semantic data, etc.) and any other available information (e.g., map data, traffic data, accident reports, weather reports, target destinations, and any other suitable information) to determine one or more goals or navigation instructions for the vehicle. As an example and not by way of limitation, based on the predicted behavior of the agents surrounding the vehicle and the traffic data to a particular destination, planning module 920 may determine a particular navigation path and associated driving operations for the vehicle to avoid possible collisions with one or more agents. In particular embodiments, planning module 920 may generate, based on a given predicted contextual presentation, several different plans (e.g., goals or navigation instructions) for the vehicle. For each plan, the planning module 920 may compute a score that represents the desirability of that plan. For example, if the plan would likely result in the vehicle colliding with an agent at a predicted location for that agent, as determined based on the predicted contextual representation, the score for the plan may be penalized accordingly. Another plan that would cause the vehicle to violate traffic rules or take a lengthy detour to avoid possible collisions may also have a score that is penalized, but the penalty may be less severe than the penalty applied for the previous plan that would result in a collision. A third plan that causes the vehicle to simply stop or change lanes to avoid colliding with the agent in the predicted future may receive the highest score. Based on the assigned scores for the plans, the planning module 920 may select the best plan to carry out. While the example above used a collision as an example, the disclosure herein contemplates the use of any suitable scoring criteria, such as travel distance or time, fuel economy, changes to the estimated time of arrival at the destination, passenger comfort, proximity to other vehicles, the confidence score associated with the predicted contextual representation, etc.

Based on the plan generated by planning module 920, which may include one or more navigation path or associated driving operations, control module 925 may determine the specific commands to be issued to the actuators of the vehicle. The actuators of the vehicle are components that are responsible for moving and controlling the vehicle. The actuators control driving functions of the vehicle, such as, for example, steering, turn signals, deceleration (braking), acceleration, gear shift, etc. As an example and not by way of limitation, control module 925 may transmit commands to a steering actuator to maintain a particular steering angle for a particular amount of time to move a vehicle on a particular trajectory to avoid agents predicted to encroach into the area of the vehicle. As another example, control module 925 may transmit commands to an accelerator actuator to have the vehicle safely avoid agents predicted to encroach into the area of the vehicle.

Figure 10A:
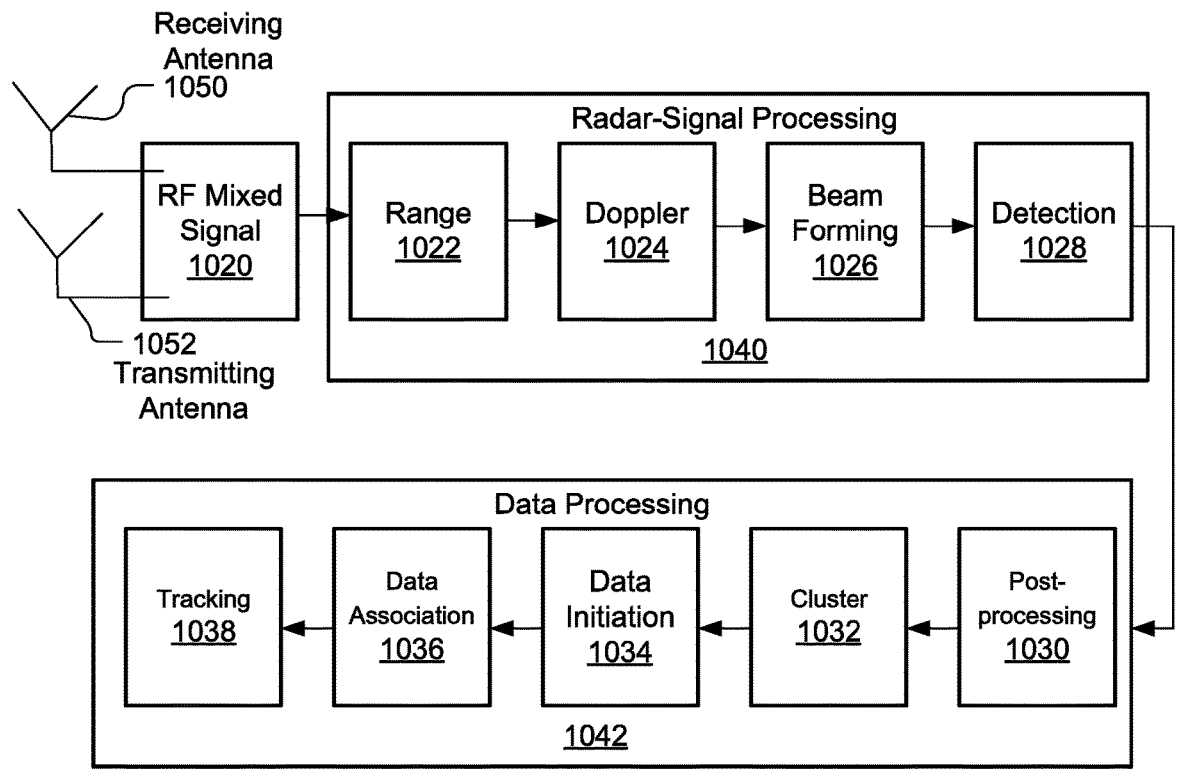
FIG. 10A-10B illustrate an example block diagram of an example radar system.
Figure 10B:
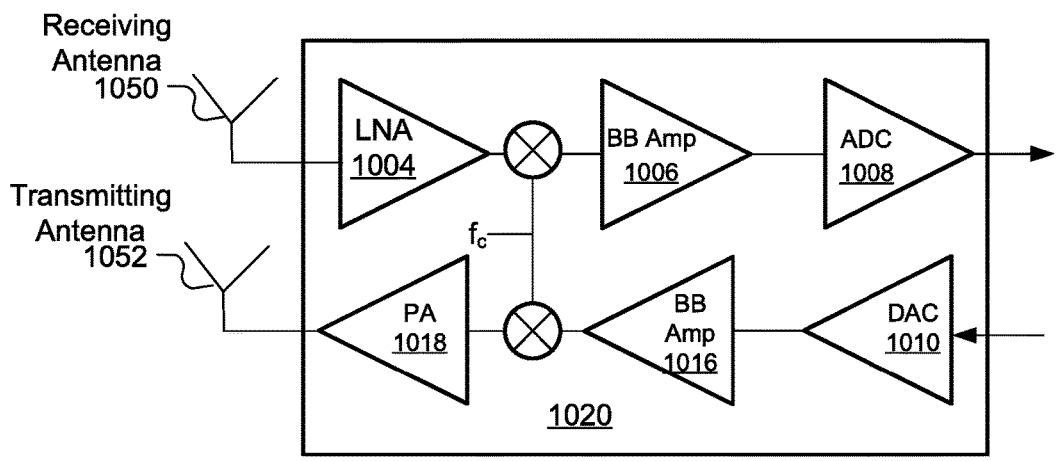

FIGS. 10A-10B illustrate a schematic of an example radar system. As illustrated in the example of FIG. 10A, a radar system 1000 may include a receiving antenna 1050, transmitting antenna 1052, as well as a number of modules, such as a RF (radio-frequency) mixed-signal module 1020, radar-signal processing module 1040, and data-processing module 1042. As described in more detail below, radar-signal processing module 1040, that includes range processing module 1022, doppler processing module 1024, beam forming module 1020, and detection module 1025. Data processing module 1042 includes post-processing module 1030, clustering module 1032, data initiation/termination 1034, data association 1036, and tracking module 1038.

Radar-signal processing module 1040 processes the reflected radar signals from RF mixed-signal module 1020 to extract information of objects in the field of view of the radar system. Range processing module 1022 of radar-signal processing module 1040 may perform a mathematical transformation of the radar data to determine the distance or range of an object (e.g., agent) from the vehicle to the object by measuring the elapsed time between sending the radar signal and receiving the reflected signal from the object. Doppler processing module 1024 may perform a mathematical transformation of the radar data from the time domain to the frequency domain to determine the velocity or Doppler of an object (e.g., agent) by measuring the frequency shift of the radar signal transmitted and the radar signal reflected by the object. Beam-forming module 1026 may perform a mathematical transformation of the radar data to determine the azimuth or lateral angle of an object (e.g., agent) by measuring the electronic phase scanning the radar signals. Detection module 1028 may associate the range, Doppler, and azimuth data of the radar data to a particular object.

Data-processing module 1040 processes the reflected radar signals from RF mixed-signal module 1020 to extract information of objects in the field of view of the radar system. Post-processing module 1030 may take the data vector contained in the Doppler, range, azimuth angle information from radar-signal processing module 1040 and converts this data into relatable object and spatial information. Cluster module 1032 may take the data from post-processing module and determine clusters that may represent the data points obtained from post-processing module 1030. In particular embodiment, data initiation/termination module 1034 may determine whether and when the determined cluster is tracked as an agent (e.g., a moving object) and when to terminate the tracking. Data association module 1036 may associate clusters of points from radar data captured at different times as representing the same object. In particular embodiments, the output of tracking module 1038 may track a cluster of data points that represents a moving or static object from radar data captured at different times RF mixed-signal module 1020 may transmit radar signals from transmitting antenna 1052 and receive radar signals reflected by objects in the field of view of the radar system from receiving antenna 1050. As illustrated in the example of FIG. 10B, the receiving side of RF mixed-signal module 1020 includes a low-noise amplifier (LNA) 1004, baseband amplifier 1006, and analog-to-digital converter (ADC) 1008. LNA 1004 receives the reflected radar signals through receiving antenna 1050 and since the received signals may be relatively low power, LNA 1004 amplifies the signal while introducing minimal noise. The mixer on the receiving side of RF mixed-signal module 1020 shifts the received radar signals from the carrier frequency ($f_c$) to the baseband frequency (low frequency). Baseband amplifier 1006 amplifies the baseband radar signals to ADC 1008. ADC 1008 converts the received signals from the analog domain to the digital domain for downstream signal processing by the data-processing module 1040.

As illustrated in the example of FIG. 10B, the transmission side of RF mixed-signal module 1020 includes a digital-to-analog converter (DAC) 1010, baseband amplifier 1016, mixer, and power amplifier (PA) 1018. A separate microcontroller determines one or more characteristics of the radar signals to be transmitted. As an example and not by way of limitation, these characteristics may include the pulse repetition frequency (PRF) or type of pulses to be transmitted by transmitting antenna 1052. DAC 1010 receives the radar signals as an analog signal and converts the digital information to analog waveforms. Baseband amplifier 1016 amplifies the baseband (low frequency) radar signals to the transmission side mixer. The transmission side mixer upconverts the baseband radar signals to the carrier frequency that is suitable for transmission through the air. In particular embodiments, receiving antenna 1050 and transmitting antenna 1052 may be integrated into a single antenna.

Figure 11:
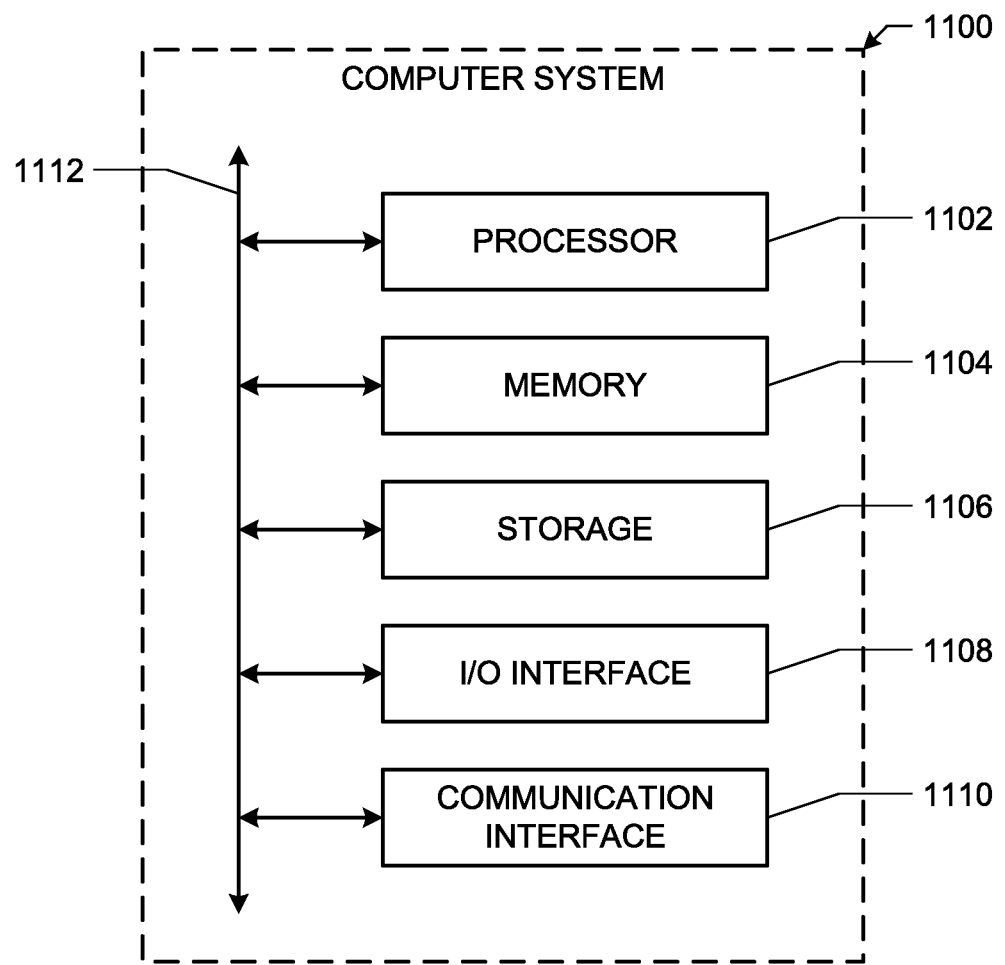
FIG. 11 illustrates an example of a computing system.

FIG. 11 illustrates an example computer system. In particular embodiments, one or more computer systems 1100 perform one or more steps of one or more methods described or illustrated herein. In particular embodiments, one or more computer systems 1100 provide the functionalities described or illustrated herein. In particular embodiments, software running on one or more computer systems 1100 performs one or more steps of one or more methods described or illustrated herein or provides the functionalities described or illustrated herein. Particular embodiments include one or more portions of one or more computer systems 1100. Herein, a reference to a computer system may encompass a computing device, and vice versa, where appropriate. Moreover, a reference to a computer system may encompass one or more computer systems, where appropriate.

This disclosure contemplates any suitable number of computer systems 1100. This disclosure contemplates computer system 1100 taking any suitable physical form. As example and not by way of limitation, computer system 1100 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1100 may include one or more computer systems 1100; be unitary or distributed; span multiple locations; span multiple machines; span multiple data centers; or reside in a cloud, which may include one or more cloud components in one or more networks. Where appropriate, one or more computer systems 1100 may perform without substantial spatial or temporal limitation one or more steps of one or more methods described or illustrated herein. As an example and not by way of limitation, one or more computer systems 1100 may perform in real time or in batch mode one or more steps of one or more methods described or illustrated herein. One or more computer systems 900 may perform at different times or at different locations one or more steps of one or more methods described or illustrated herein, where appropriate.

In particular embodiments, computer system 1100 includes a processor 1102, memory 1104, storage 1106, an input/output (I/O) interface 1108, a communication interface 1110, and a bus 1112. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1102 includes hardware for executing instructions, such as those making up a computer program. As an example and not by way of limitation, to execute instructions, processor 1102 may retrieve (or fetch) the instructions from an internal register, an internal cache, memory 1104, or storage 1106; decode and execute them; and then write one or more results to an internal register, an internal cache, memory 1104, or storage 1106. In particular embodiments, processor 1102 may include one or more internal caches for data, instructions, or addresses. This disclosure contemplates processor 1102 including any suitable number of any suitable internal caches, where appropriate. As an example and not by way of limitation, processor 1102 may include one or more instruction caches, one or more data caches, and one or more translation lookaside buffers (TLBs). Instructions in the instruction caches may be copies of instructions in memory 1104 or storage 1106, and the instruction caches may speed up retrieval of those instructions by processor 1102. Data in the data caches may be copies of data in memory 1104 or storage 1106 that are to be operated on by computer instructions; the results of previous instructions executed by processor 1102 that are accessible to subsequent instructions or for writing to memory 1104 or storage 1106; or any other suitable data. The data caches may speed up read or write operations by processor 1102. The TLBs may speed up virtual-address translation for processor 1102. In particular embodiments, processor 1102 may include one or more internal registers for data, instructions, or addresses. This disclosure contemplates processor 1102 including any suitable number of any suitable internal registers, where appropriate. Where appropriate, processor 1102 may include one or more arithmetic logic units (ALUs), be a multi-core processor, or include one or more processors 1102. Although this disclosure describes and illustrates a particular processor, this disclosure contemplates any suitable processor.

In particular embodiments, memory 1104 includes main memory for storing instructions for processor 1102 to execute or data for processor 1102 to operate on. As an example and not by way of limitation, computer system 1100 may load instructions from storage 1106 or another source (such as another computer system 1100) to memory 1104. Processor 1102 may then load the instructions from memory 1104 to an internal register or internal cache. To execute the instructions, processor 1102 may retrieve the instructions from the internal register or internal cache and decode them. During or after execution of the instructions, processor 1102 may write one or more results (which may be intermediate or final results) to the internal register or internal cache. Processor 1102 may then write one or more of those results to memory 1104. In particular embodiments, processor 1102 executes only instructions in one or more internal registers or internal caches or in memory 1104 (as opposed to storage 1106 or elsewhere) and operates only on data in one or more internal registers or internal caches or in memory 1104 (as opposed to storage 1106 or elsewhere). One or more memory buses (which may each include an address bus and a data bus) may couple processor 1102 to memory 1104. Bus 1112 may include one or more memory buses, as described in further detail below. In particular embodiments, one or more memory management units (MMUs) reside between processor 1102 and memory 1104 and facilitate accesses to memory 1104 requested by processor 1102. In particular embodiments, memory 1104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1104 may include one or more memories 1104, where appropriate. Although this disclosure describes and illustrates particular memory, this disclosure contemplates any suitable memory.

In particular embodiments, storage 1106 includes mass storage for data or instructions. As an example and not by way of limitation, storage 1106 may include a hard disk drive (HDD), a floppy disk drive, flash memory, an optical disc, a magneto-optical disc, magnetic tape, or a Universal Serial Bus (USB) drive or a combination of two or more of these. Storage 1106 may include removable or non-removable (or fixed) media, where appropriate. Storage 1106 may be internal or external to computer system 1100, where appropriate. In particular embodiments, storage 1106 is non-volatile, solid-state memory. In particular embodiments, storage 1106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1106 taking any suitable physical form. Storage 1106 may include one or more storage control units facilitating communication between processor 1102 and storage 1106, where appropriate. Where appropriate, storage 1106 may include one or more storages 1106. Although this disclosure describes and illustrates particular storage, this disclosure contemplates any suitable storage.

In particular embodiments, I/O interface 1108 includes hardware, software, or both, providing one or more interfaces for communication between computer system 1100 and one or more I/O devices. Computer system 1100 may include one or more of these I/O devices, where appropriate. One or more of these I/O devices may enable communication between a person and computer system 1100. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1108 for them. Where appropriate, I/O interface 1108 may include one or more device or software drivers enabling processor 1102 to drive one or more of these I/O devices. I/O interface 1108 may include one or more I/O interfaces 1108, where appropriate. Although this disclosure describes and illustrates a particular I/O interface, this disclosure contemplates any suitable I/O interface.

In particular embodiments, communication interface 1110 includes hardware, software, or both providing one or more interfaces for communication (such as, for example, packet-based communication) between computer system 1100 and one or more other computer systems 1100 or one or more networks. As an example and not by way of limitation, communication interface 1110 may include a network interface controller (NIC) or network adapter for communicating with an Ethernet or any other wire-based network or a wireless NIC (WNIC) or wireless adapter for communicating with a wireless network, such as a WI-FI network. This disclosure contemplates any suitable network and any suitable communication interface 1110 for it. As an example and not by way of limitation, computer system 1100 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1100 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or any other suitable wireless network or a combination of two or more of these. Computer system 1100 may include any suitable communication interface 1110 for any of these networks, where appropriate. Communication interface 1110 may include one or more communication interfaces 1110, where appropriate. Although this disclosure describes and illustrates a particular communication interface, this disclosure contemplates any suitable communication interface.

In particular embodiments, bus 1112 includes hardware, software, or both coupling components of computer system 1100 to each other. As an example and not by way of limitation, bus 1112 may include an Accelerated Graphics Port (AGP) or any other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1112 may include one or more buses 1112, where appropriate. Although this disclosure describes and illustrates a particular bus, this disclosure contemplates any suitable bus or interconnect.

Herein, a computer-readable non-transitory storage medium or media may include one or more semiconductor-based or other types of integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system associated with a vehicle:
   accessing a plurality of data points captured using a radar system of the vehicle, wherein each data point is associated with at least three measurements comprising a Doppler measurement, a range measurement, and an azimuth measurement in reference to the radar system;
   clustering the plurality of data points into one or more first clusters based on a first pair of the three measurements associated with each of the data points;
   clustering the plurality of data points into one or more second clusters based on a second pair of the three measurements associated with each of the data points, the second pair being different from the first pair of the three measurements, wherein the one or more first clusters and the one or more second clusters each include a plurality of the data points;
   comparing the one or more first clusters and the one or more second clusters to identify one or more overlap clusters that represent respective ones of the first clusters and the second clusters that correspond,
   wherein comparing includes determining an intersection of data points between a particular first cluster of the first clusters and a particular second cluster of the second clusters using dimensions corresponding to the second pair, and wherein comparing includes determining a center of an overlap cluster of the overlap clusters by weighting data points of the overlap cluster according to a received signal strength indicator (RSSI) of the data points;
   associating the data points of each of the overlap clusters as an object in an environment of the vehicle; and
   removing one or more of the overlap clusters that have been previously identified based on a number of data points of the one or more of the overlap clusters being less than a threshold number of data points.

2. The method of claim 1, wherein comparison comprises:
   identifying the particular second cluster corresponding to the particular first cluster based on a similar range associated with the data points of the particular first cluster and the data points of the particular second cluster.

3. The method of claim 2, further comprising assigning one or more data points of the particular first cluster or the particular second cluster outside the intersection of the plurality of data points to a corresponding overlap cluster based on a value of the RSSI of the one or more data points being higher than a threshold RSSI value.

4. The method of claim 1, further comprising removing one or more data points from one or more of the overlap clusters based on a Doppler variation of the one or more data points being greater than a threshold amount of Doppler variation.

5. The method of claim 1, further comprising removing one or more data points from one or more of the overlap clusters based on a range variation of the one or more data points being greater than a threshold amount of range variation.

6. The method of claim 1, further comprising removing one or more data points from one or more of the overlap clusters based on an azimuth variation of the one or more data points being greater than a threshold amount of azimuth variation.

7. The method of claim 1, further comprising filtering one or more data points in a range/azimuth space based on a value of the RSSI of the data point being lower than a threshold RSSI value.

8. The method of claim 1, further comprising determining a center location associated with the one or more overlap clusters based on an average of a value of each location of the data points of the overlap cluster.

9. The method of claim 1, further comprising determining a Doppler velocity associated with the one or more overlap clusters based on an average Doppler velocity of the data points of the overlap cluster and weighted by a value of the RSSI of each data point of the overlap cluster.

10. The method of claim 1, further comprising filtering data points that are not associated with one of the one or more overlap clusters.

11. One or more computer-readable non-transitory storage media embodying software that is operable when executed to cause one or more processors to perform operations comprising:
   accessing a plurality of data points captured using a radar system of a vehicle, wherein each data point is associated with at least three measurements comprising a Doppler measurement, a range measurement, and an azimuth measurement in reference to the radar system;
   clustering the plurality of data points into one or more first clusters based on a first pair of the three measurements associated with each of the data points;
   clustering the plurality of data points into one or more second clusters based on a second pair of the three measurements associated with each of the data points, the second pair being different from the first pair of the three measurements, wherein the one or more first clusters and the one or more second clusters each include a plurality of the data points;
   comparing the one or more first clusters and the one or more second clusters to identify one or more overlap clusters that represent respective ones of the first clusters and the second clusters that correspond,
   wherein comparing includes determining an intersection of data points between a particular first cluster of the first clusters and a particular second cluster of the second clusters using dimensions corresponding to the second pair, and wherein comparing includes determining a center of an overlap cluster of the overlap clusters by weighting data points of the overlap cluster according to a received signal strength indicator (RSSI) of the data points;
   associating the data points of each of the overlap clusters as an object in an environment of the vehicle; and
   removing one or more of the overlap clusters that have been previously identified based on a number of data points of the one or more of the overlap clusters being less than a threshold number of data points.

12. The computer-readable non-transitory storage media of claim 11, wherein the software is further configured to:
   identify the particular second cluster corresponding to the particular first cluster based on a similar range associated with the data points of the particular first cluster and the data points of the particular second cluster.

13. The computer-readable non-transitory storage media of claim 12, wherein the software is further configured to assign one or more data points of the particular first cluster or the particular second cluster outside the intersection of the plurality of data points to a corresponding overlap cluster based on a value of the RSSI of the one or more data points being higher than a threshold RSSI value.

14. The computer-readable non-transitory storage media of claim 11, wherein the software is further configured to remove one or more data points from one or more of the overlap clusters based on a Doppler variation of the one or more data points being greater than a threshold amount of Doppler variation.

15. A computing system comprising:
   one or more processors; and
   one or more computer-readable non-transitory storage media coupled to one or more of the processors, the one or more computer-readable non-transitory storage media comprising instructions operable when executed by one or more of the processors to cause the computing system to perform operations comprising:
   accessing a plurality of data points captured using a radar system of a vehicle, wherein each data point is associated with at least three measurements comprising a Doppler measurement, a range measurement, and an azimuth measurement in reference to the radar system;
   clustering the plurality of data points into one or more first clusters based on a first pair of the three measurements associated with each of the data points;
   clustering the plurality of data points into one or more second clusters based on a second pair of the three measurements associated with each of the data points, the second pair being different from the first pair of the three measurements;
   comparing the one or more first clusters and the one or more second clusters to identify one or more overlap clusters that represent respective ones of the first clusters and the second clusters that correspond, wherein the one or more first clusters and the one or more second clusters each include a plurality of the data points,
   wherein comparing includes determining an intersection of data points between a particular first cluster of the first clusters and a particular second cluster of the second clusters using dimensions corresponding to the second pair, and wherein comparing includes determining a center of an overlap cluster of the overlap clusters by weighting data points of the overlap cluster according to a received signal strength indicator (RSSI) of the data points;
   associating the data points of each of the overlap clusters as an object m an environment of the vehicle; and
   removing one or more of the overlap clusters that have been previously identified based on a number of data points of the one or more of the overlap clusters being less than a threshold number of data points.

16. The computing system of claim 15, wherein the processors are further operable to:
   identify the particular second cluster corresponding to the particular first cluster based on a similar range associated with the data points of the particular first cluster and the data points of the particular second cluster.

17. The computing system of claim 16, wherein the processors are further operable to assign one or more data points of the particular first cluster or the particular second cluster outside the intersection of the plurality of data points to a corresponding overlap cluster based on a value of the RSSI of the one or more data points being higher than a threshold RSSI value.

18. The computing system of claim 15, wherein the processors are further operable to remove one or more data points from one or more of the overlap clusters based on a Doppler variation of the one or more data points being greater than a threshold amount of Doppler variation.

* * * * *